Figure 1:
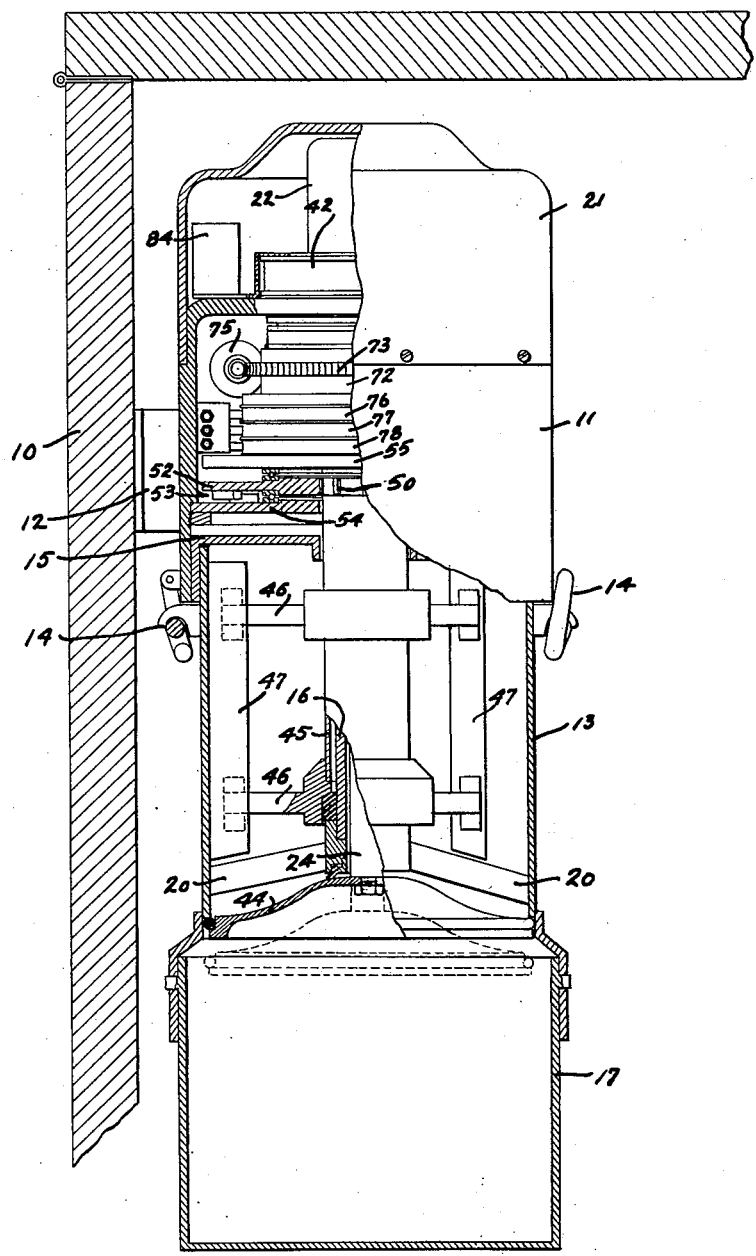

Oct. 8, 1957 L. C. UPDEGRAFF 2,808,706
AUTOMATIC ICE CREAM FREEZERS
Filed April 13, 1955 6 Sheets-Sheet 1

INVENTOR.
LEE C. UPDEGRAFF
BY
Bean, Brooks, Buckley & Bean.
ATTORNEYS

Oct. 8, 1957    L. C. UPDEGRAFF    2,808,706
AUTOMATIC ICE CREAM FREEZERS
Filed April 13, 1955    6 Sheets-Sheet 3

INVENTOR.
LEE C. UPDEGRAFF
BY
Bean, Brooks, Buckley & Bean
ATTORNEYS

Oct. 8, 1957      L. C. UPDEGRAFF      2,808,706
AUTOMATIC ICE CREAM FREEZERS

Filed April 13, 1955      6 Sheets-Sheet 4

INVENTOR.
LEE C. UPDEGRAFF
BY
Bean, Brooks Buckley, Bean.
ATTORNEYS

Oct. 8, 1957  L. C. UPDEGRAFF  2,808,706
AUTOMATIC ICE CREAM FREEZERS
Filed April 13, 1955  6 Sheets-Sheet 6

INVENTOR.
LEE C. UPDEGRAFF
BY
Beau, Brooks, Buckley & Beau
ATTORNEYS

United States Patent Office 2,808,706
Patented Oct. 8, 1957

2,808,706
AUTOMATIC ICE CREAM FREEZERS
Lee C. Updegraff, White Plains, N. Y.

Application April 13, 1955, Serial No. 501,125

15 Claims. (Cl. 62—4)

My invention relates in general to domestic appliances and in particular to ice cream freezers. In general it provides means attachable to and for use in conjunction with a cold storage chest or cabinet, with the principal object of performing automatically the necessary operations to freeze and harden ice cream, sherbet and similar frozen confections in complete readiness for storage or use, free of any encumbrance of the dasher element to storage or dispensing of the product.

The automatic ice cream freezer and method of making ice cream described hereinafter affords practicable means of overcoming the chief deficiency common to all previous developments of power-driven ice cream freezers designed for use as domestic appliances; that is, the lack of suitable means for separation of the dasher element from the frozen mixture, to eliminate the encumbrance of such element to subsequent storage and dispensing of the product. This impediment represents the main obstacle to the successful development of a completely automatic ice cream freezer. The problem, however, is complicated by the well known fact that differing mixtures of ingredients to be frozen require churning periods of different duration to produce a smooth and uniform product of superior quality. This problems is effectively surmounted in the commercial manufacture of ice cream by the removal of the partially frozen products from the freezer unit while the mixture is in a semi-fluid state, followed by storage under continued low-temperature refrigeration for final hardening in dispensing containers suitable for ultimate use of the product.

The device hereinafter described has accordingly been developed with the object of providing a practicable and efficient means of applying the above principles to the development of a completely automatic ice cream freezer suitable for domestic use in conjunction with a cold-storage chest or cabinet of conventional design.

More specifically, one of the objects of my invention is to provide means for automatically separating the dasher element of the freezer from the partly frozen mixture before final freezing thereof.

Another object is to provide means automatically controlled by the partly frozen mixture to determine the proper consistency suitable for the removal of the dasher element therefrom.

Another object is to provide a device which may be readily disassembled for cleaning.

A further object is to provide means for rotating the dasher for a predetermined period after separation thereof from the partly frozen mixture in order to provide for "after-operation" of the dasher element to assist in discharging the product into the hardening receptacle before final shut-down of the device.

Furthermore, my invention contemplates the use of a dump valve between the freezing chamber and the freezing receptacle, whereby the partly frozen mixture may be deposited into the freezing receptacle for final freezing.

Moreover, my device contemplates the use of a freezing receptacle therebeneath the freezing chamber for receiving the partly frozen mixture for final freezing.

Figure 2:
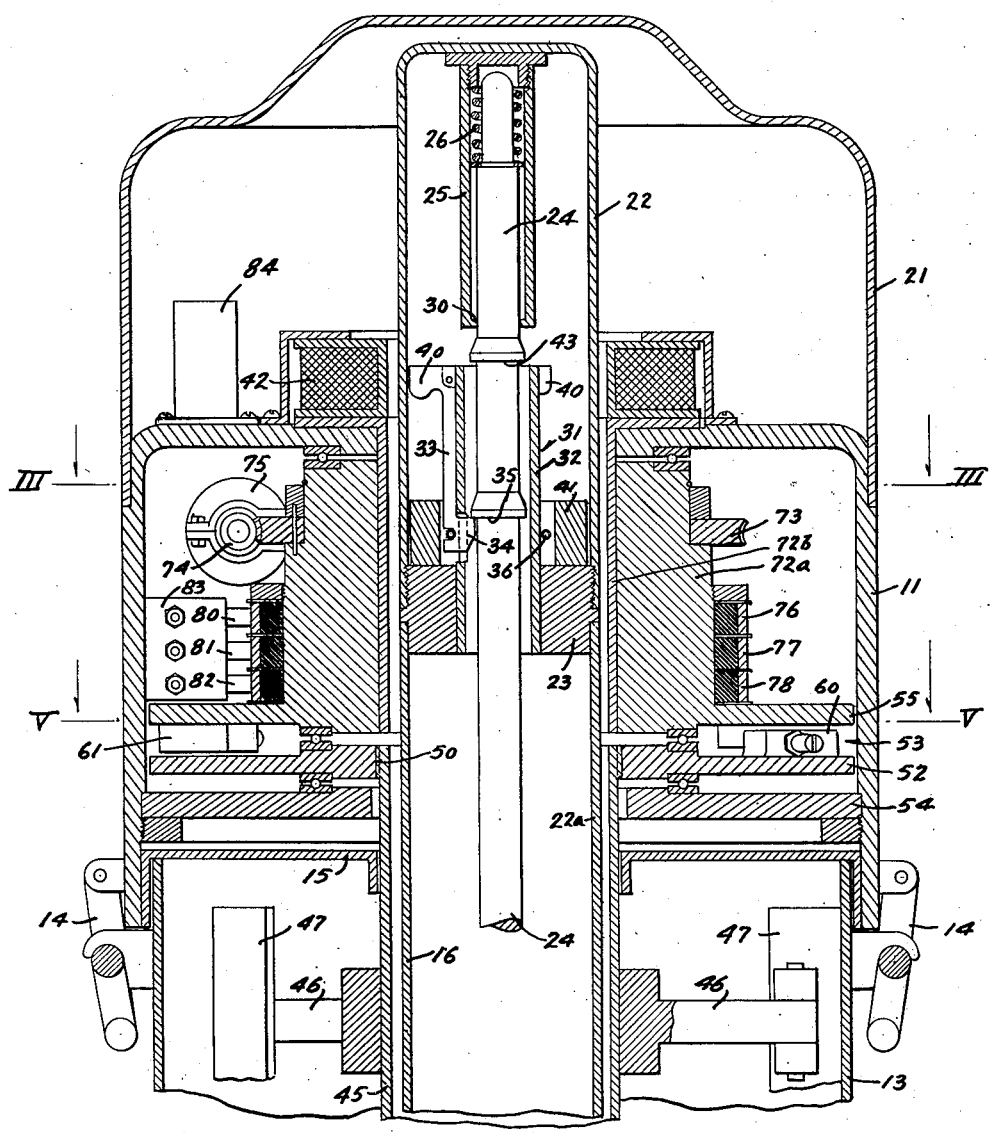
Figure 3:
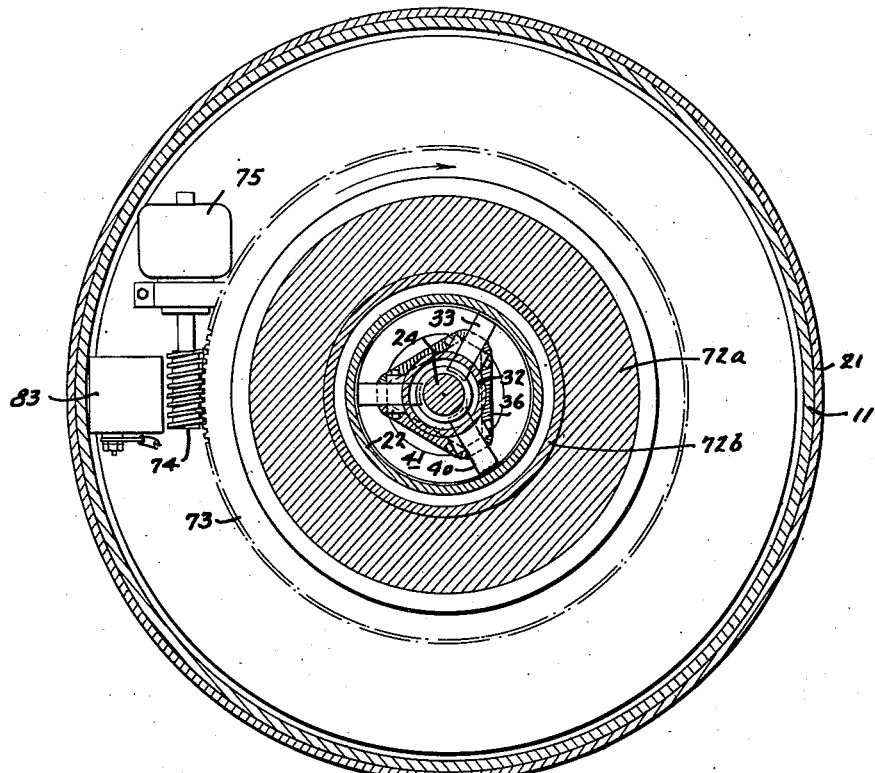
Figure 4:
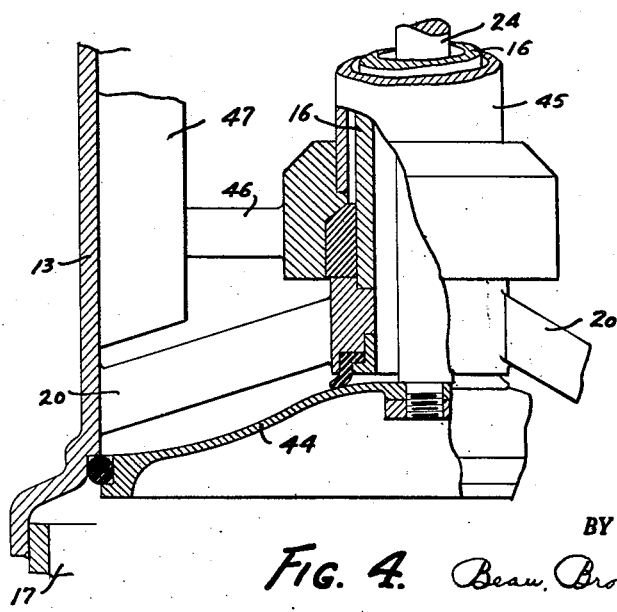
Figure 5:
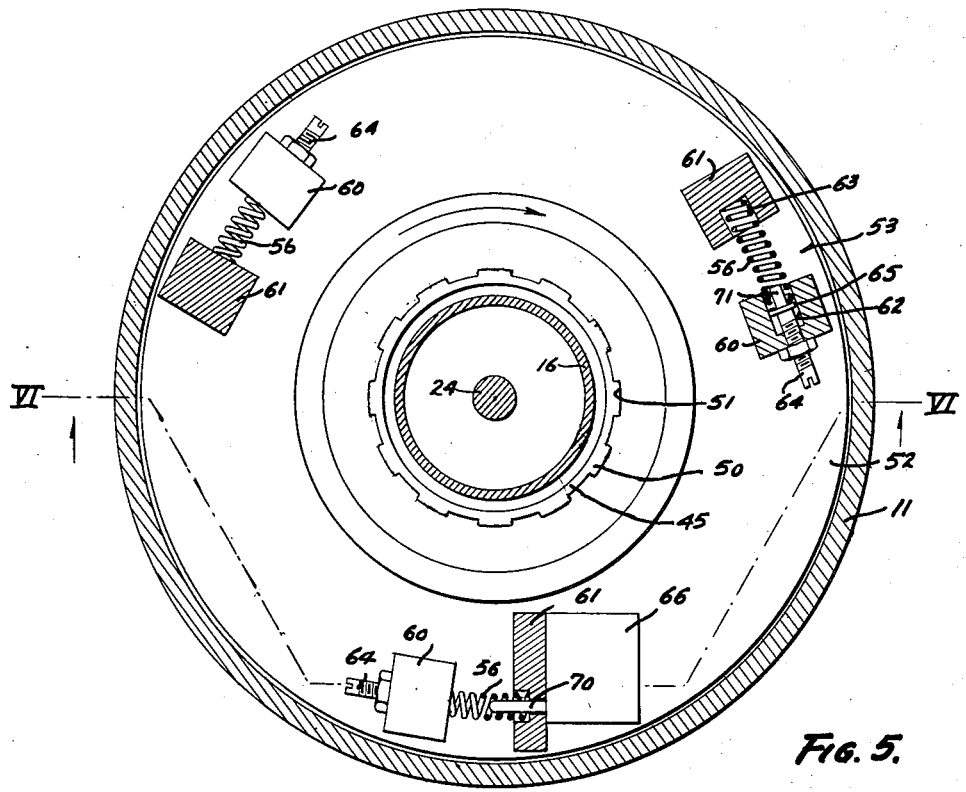
Figure 6:
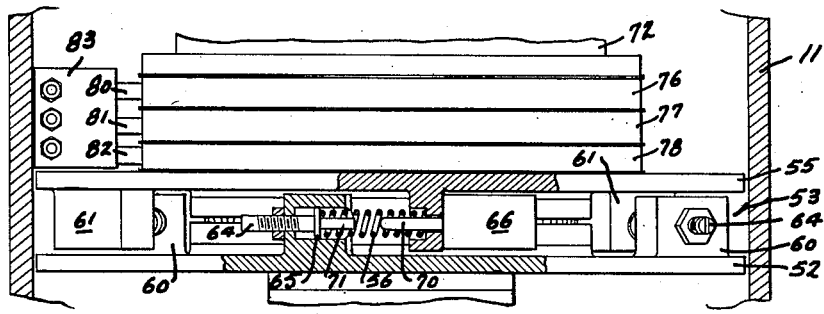
Figure 7:
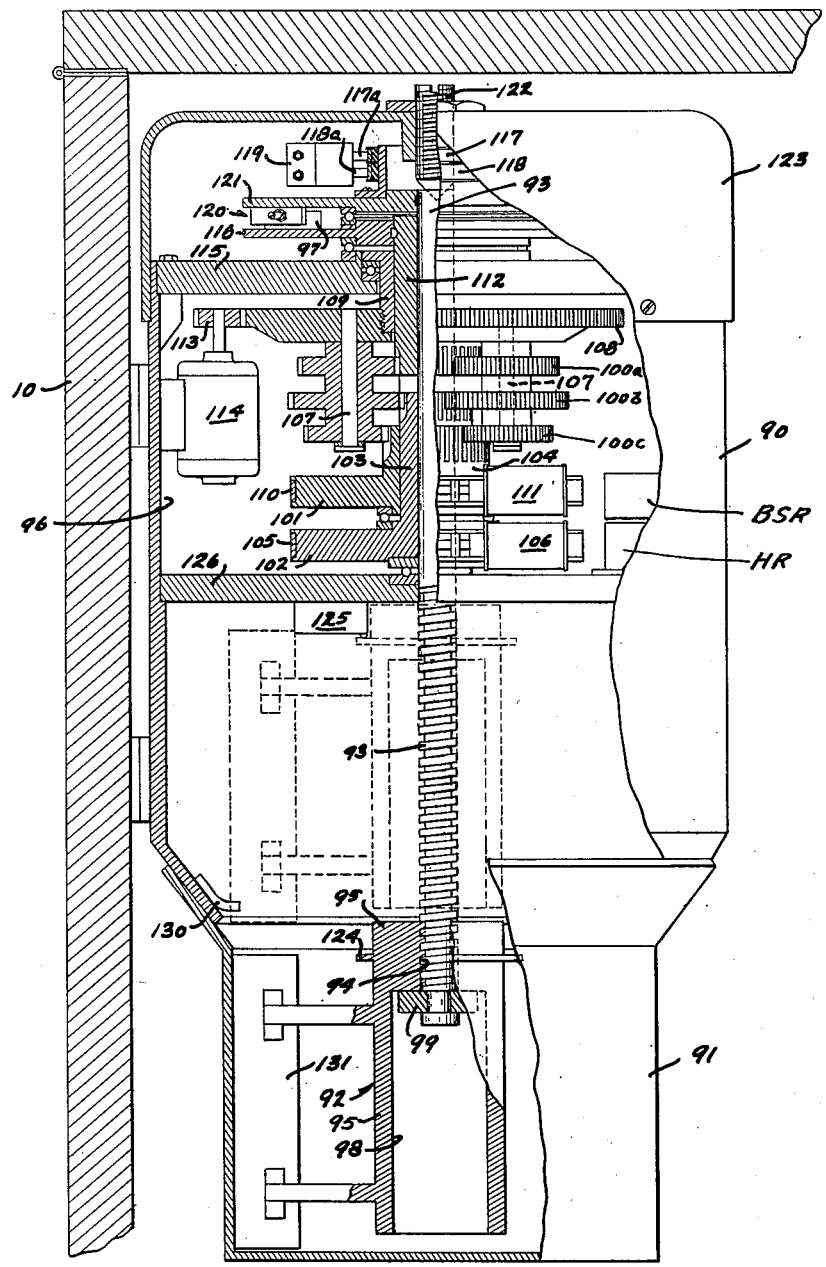
Figure 8:
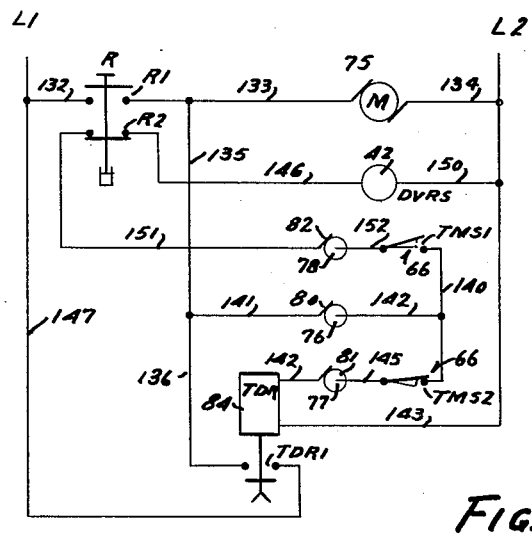
Figure 9:
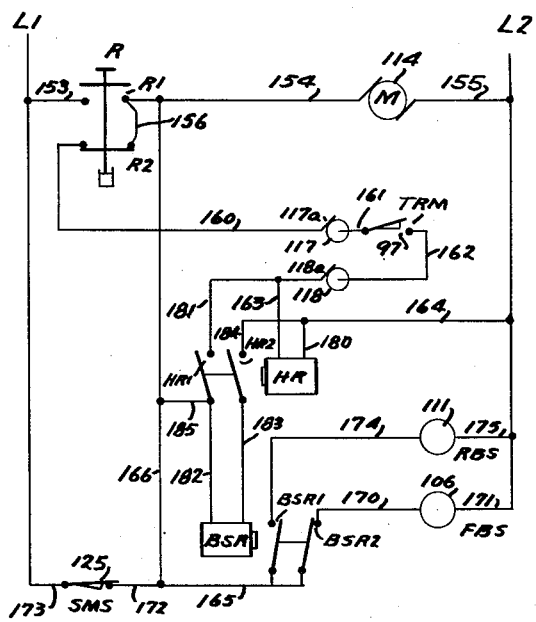

The above objects and advantages have been accomplished by the device shown in the accompanying drawings, of which:

Fig. 1 is a side elevation of my device;
Fig. 2 is an enlarged sectional elevation of the upper portion thereof;
Fig. 3 is a transverse sectional view taken on line III—III of Fig. 2;
Fig. 4 is an enlarged fragmentary longitudinal sectional elevation of the lower portion of the device;
Fig. 5 is a transverse sectional view taken on line V—V of Fig. 2;
Fig. 6 is a sectional view taken on line VI—VI of Fig. 5 with portions thereof broken away;
Fig. 7 is a fragmentary longitudinal sectional view of a modified form of device;
Fig. 8 is an electrical diagram showing the circuits of the form of invention shown in Figs. 1 to 6, inclusive; and
Fig. 9 is a similar diagrammatical view of modified form of structure shown in Fig. 7.

Referring now to the form of invention shown in Figs. 1 to 6, inclusive, 10 represents the cold storage or freezing chest with which my device is designed to be used. The device comprises a housing 11 which is removably mounted within the chest by means of a suitable support 12. Detachably suspended from the housing 11 is the freezer casing 13 which is secured to the housing preferably by a number of toggle clamps 14 of well-known type. A freezer cover 15 is disposed over the top of the freezer casing and a storage receptacle 17 is removably suspended beneath said casing. A stationary casing sleeve 16 has its lower end supported at the bottom of the freezer casing by means of a number of supporting arms 20. This casing sleeve extends upwardly through and above the housing 11 where it is suitably enclosed by means of a top cover 21. The upper portion 22 of the casing sleeve 16 is secured to the lower portion 22a thereof by means of a coupling flange 23, and extending upwardly through the casing sleeve is a dump valve spindle 24. The spindle extends upwardly through the coupling flange 23 and has its upper end disposed in a spring housing 25 which is carried by the upper part 22 of the casing sleeve and within which is mounted a dump valve actuating spring 26. The spindle is reduced in diameter at its upper end to accommodate the actuating spring and the lower end of the spring housing is formed with a suitable flange 30 which limits the lower movement of the spring when the valve spindle is moved downwardly as will be described hereinafter. Mounted within the upper portion 22 of the casing sleeve is the spindle latch 31. This latch comprises a downwardly extending cage 32 which is supported by the coupling flange 23 and which pivotally supports three or more latch fingers 33. Each of these latch fingers has a latch lug 34 extending inwardly from its lower end for engagement with a latch shoulder 35, whereby the spindle will be held in the upper position shown in Fig. 2 until the latch lugs are released from the shoulder. The latch lugs are held in positions shown by means of a garter spring 36 which surrounds the latch fingers and the cage. Each of the latch fingers is provided at its upper end with an outwardly extending trip lug 40 which is engaged by a solenoid latch-release core 41. This core surrounds the latch fingers and is normally supported upon the coupling flange 23. A solenoid 42 is fixedly supported atop the housing 11, and when energized causes the solenoid latch core to be drawn upwardly whereupon it will contact the trip lugs 40 of the latch fingers and thereby release the latch lugs 34 from engagement with the latch shoulder 35 of the spindle 24 and allow the spindle to be forced downwardly by gravity and under the action of the actuating spring 26. Since the release of the latch lugs is substantially instantaneous the latch fingers will, therefore, be immediately drawn inwardly to their normal positions by the garter spring 36 and will then engage a stop shoulder 43 formed on the dump valve spindle 24 to arrest further downward movement of this spindle. The spindle carries a dump valve 44 at its lower end which when in the position shown in Fig. 1 serves to close the bottom of the freezing casing; and, during the operation of the device, this valve is maintained in closed position until such time as the partly frozen mixture has reached the proper consistency. The thickness and shape of this valve are such as to provide flexibility to permit engagement of the spindle latch while also maintaining a tight seal of the bottom closure.

Surrounding the lower end of the casing sleeve 16 is a dasher sleeve 45 having arms 46 for supporting the dasher elements 47. This sleeve extends upwardly through the freezer casing and its upper end is formed with splines 50 which engage grooves 51 formed in the lower drive plate 52 of a torque assembly 53. The lower drive plate 52 is mounted in suitable bearings carried by a housing flange 54 rigidly mounted in the lower end of the housing 11. Rotatably mounted above the lower drive plate is an upper drive plate 55. By reference to Fig. 5, it will be seen that the upper and lower plates 55 and 52, respectively, of the torque assembly are connected in driving relation through the medium of a series of compression springs 56 mounted between lugs 60 carried by the lower plate 52 and lugs 61 carried by the upper plate 55 and in spaced relation with each other. One of the ends of each of the springs is mounted in a recess 62 formed in the lug 60 and the other end of each spring is mounted in a recess 63 formed in each of the lugs 61. Carried by each of the lugs 60 is an adjusting screw 64 which is formed with a flange member 65 adjustably disposed within the recess 62 of the lug, whereby the tension of the springs may be adjusted. Carried by one of the lugs 61 is a double throw microswitch 66 having normally closed contact TMS2 and normally open contact TMS1 (see Fig. 8). The actuating plunger 70 of this switch is extended through a portion of the spring 56 and is engageable with an extension 71, carried by the adjusting screw, when the spring has been compressed by relative movement of the upper and lower drive plates of the torque assembly to control an electric circuit, whereby the actuation of the dasher sleeve is interrupted, as will be hereinafter described.

The upper drive plate 55 preferably forms a part of the main drive sleeve 72a which is rotatably mounted on guide bearing sleeve 72b of the device. Drive sleeve 72a also carries a worm gear 73 which is driven by a worm 74 carried by the drive motor 75 of the device. Current is conducted to and from the microswitch 66 by a plurality of collector rings 76, 77, and 78 carried by the drive sleeve 72a and engaged by a series of brushes 80, 81 and 82, respectively, carried by a brush holder 83. The brush holder is suitably secured to the housing 11. A time delay relay 84 is carried preferably by the top of the housing 11 whereby the dasher will be kept rotating for a predetermined period after the partially frozen mixture has been dumped into the storage receptacle thus providing for a suitable period of afteroperation of the dasher element to assist in discharging the product before final shut-down.

Referring now to the form of invention shown in Fig. 7, the device comprises an outer housing 90 below which is removably secured a freezing receptacle 91. The dasher assembly 92 is normally disposed above the freezing compartment in this form of the invention and is lowered into the freezing-receptacle with the start of operations, and is retracted therefrom when the partly frozen mixture has reached the proper consistency. In Fig. 7 the working position of the dasher element is shown in full lines, and the retracted position in dotted lines. The dasher is demountably assembled, by means of a snap-on collar 99, upon a threaded drive shaft 93 which engages a screwthreaded aperture 94 and which extends down through a bore 98 formed in the lower end of the hub 95 of the dasher. The screwthreaded drive shaft extends upwardly through the lower part of the housing 90 and into a gear compartment 96 where it is driven by a series of triple planetary gears 100a, 100b and 100c and through action of brake drums 101 and 102. The brake drum 102 is carried by a gear sleeve 103, and the brake drum 101 is carried by a gear sleeve 104. The sleeve 104 is mounted upon the sleeve 103 and may be rotated relatively therewith. The upper end of the sleeve 103 is formed with gear teeth for engagement with the planetary gear 100b. The sleeve 104 is also formed with gear teeth for engagement with the planetary gear 100c. The brake drum 102 is provided with a brake band 105 which is controlled by a forward drive solenoid 106, and a brake band 110 is carried by the brake drum 101 and is controlled by a reverse drive solenoid 111. The planetary gears are rotatably mounted upon suitable shafts 107 carried by a main drive gear 108. The main drive gear is carried by a bearing sleeve 109 which is rotatably supported by a bearing flange 115 mounted atop the gear compartment 96. The drive gear is driven by means of a drive pinion 113 mounted upon the shaft of an electric motor 114. A driving gear-sleeve 112 which is formed with gear teeth and which receives its driving force through rotation of uppermost planetary gear 100a extends upwardly through the bearing sleeve 109 and has the lower driving plate 116 of the torque assembly 120 secured thereto. Thus, with main drive gear 108 and triple gears 100a, 100b and 100c continuously turning in one direction, when brake band 105 is applied to hold gear sleeve 103 stationary, driving force is applied through triple gear shafts 107 and planetary gears 100b and 100a to turn driving gear sleeve 112 and torque assembly 120 at a reduced speed in forward direction; and similarly, when brake band 110 is applied to hold gear sleeve 104 stationary, driving force is alternatively applied through triple gear shafts 107 and planetary gears 100c and 100a to turn driving gear sleeve 112 and torque assembly 120 at a reduced, but somewhat greater speed, in reverse direction. The torque assembly is provided with a limit switch 97 having normally open contacts TRM. The upper driven plate 121 of the torque assembly is nonrotatably secured to the upper end of the drive shaft 93 whereby the drive shaft is driven through the torque assembly in a manner similar to that described in the other form of invention. The upper end of the drive shaft is maintained in alignment by means of a pivot screw 122 carried by the upper casing part 123 and engaging a conically shaped recess formed in the upper end of the shaft. An upstanding hub is carried by the upper plate 121 and mounted upon this hub are collector rings 117 and 118 which are connected to the limit switch 97 by siutable leads to be hereinafter described in connection with Fig. 9. Engaging the collector rings are brushes 117a and 118a, respectively, which are carried by a fixed brush holder 119 which is preferably supported from bearing flange 115.

In this form of the invention the mixture to form the frozen dessert is placed within the freezing receptacle 91 after which the forward drive solenoid 106 is energized. This will cause the brake drum 102 to be held stationary which will, through the gearing hereinbefore described, cause the rotation of the threaded drive shaft 93 in such a direction as to impel the dasher element 92 downwardly into the mixture and thereafter rotate it in the mixture in the proper direction. When, however, the consistency of the partly frozen mixture has reached the proper degree, the torque switch mechanism will be brought into play to deenergize the forward drive solenoid 106 and to energize the reverse drive solenoid 111. This will cause the brake drum 101 to be stationarily held and through the planetary gearing will cause the screw to be rotated in the reverse direction to withdraw the dasher element 92 from the partly frozen mixture. The hub 95 of the dasher element is formed with a switch flange 124 which engages a microswitch 125 carried by the upper wall 126 of the housing 90. This switch is a normally closed switch and will be opened by contact of the switch flange when the dasher assembly has reached the upper end of its stroke. A detent 130 is secured to the lower end of the housing 90 and projects inwardly in the path of the dasher 131 of the dasher element when the dasher is in its upper position so as to restrain the rotation of the same when it is being screwed either downwardly into or upwardly out of the mixture in the freezing compartment.

Referring now to the electrical diagram of Fig. 8 which shows the circuits of the form of invention shown in Figs. 1 to 6, L1 and L2 are electrical supply lines, and the drive motor 75 is energized through the starter switch R and leads 132, 133 and 134 which are connected in series with the electric supply lines L1 and L2. The time delay relay 84 is employed to maintain the flow of current through the motor when the starter switch R is released and it is provided with normally open contacts TDR1 which are closed when the switch R is closed and which remain closed for the time set by this relay. The starter switch R has a delayed return action and is provided with normally open contacts R1 and normally closed contacts R2.

When the starter switch R is closed current will flow to the motor through the switch from the supply line L1 to supply line L2 over leads 132, 133 and 134. Current will also flow to the time delay relay 84 through leads 135, 141, brush 80 and collector ring 76, leads 142 and 140 to and through normally closed contacts TMS2 of limit switch 66, lead 145, collector ring 77 and brush 81 to the coil of relay 84 over lead 142, and current will return to L2 over lead 143. Contacts TDR1 of relay 84 will thus be closed and current will flow to the motor 75 over lead 147, contacts TDR1 and leads 135, 136 and 133 back to supply line L2 through lead 134. As long as the normally closed contacts TMS2 of limit switch 66 remain closed, current will continue to flow through the motor 75, and relay 84 will be maintained in energized position.

The normally closed contacts R2 of starter switch R are opened when the starter switch is depressed in the closing of contacts R1 thereof. One of the contacts R2 of the starter switch R is connected to the dump valve latch solenoid 42 through lead 146, the other side of this solenoid being connected to the supply line L2 by means of lead 150. The other contact R2 of the starter switch is connected to brush 82 by means of a lead 151, the coacting collector ring 78 being connected to one of the normally open contacts TMS1 of limit switch 66 by means of the lead 152. The opposite contact TMS1 of this limit switch is connected to lead 140. As hereinbefore stated the starter switch R is of the time delay type whereby completion of the circuit through solenoid 42 is prevented and premature tripping of the dump valve mechanism is avoided in the event that accelerating torque should cause the inadvertent closing of the contact TMS1 of limit switch 66 during the starting up period. Although accelerating torque may similarly effect a momentary opening of the normally closed contacts TMS2 of limit switch 66 no interruption of the circuit to the driving motor 75 will result because the starting circuit will be maintained during such interval by the delayed opening feature of the time delay relay 84. Obviously, such inadvertant actuation of the contacts TMS1 or TMS2 of the limit switch 66 will be but momentary, and the circuit through relay 84 will be reestablished before the contacts TDR1 thereof are actually separated. When the starting switch has returned to its normally open position, the contacts R2 thereof will be closed and the dump valve latch solenoid 42 will be brought in series with brush 82, the coacting collector ring 78 and open contacts TMS1 of limit switch 66 for actuation at the proper time.

When the consistency of the partly frozen mixture reaches the proper degree in the form of invention shown in Figs. 1 to 6, normally closed contact TMS2, of limit switch 66 will be opened and normally open contacts TMS1 thereof will be closed. With the closing of limit switch contact TMS1 current will be conducted to the dump valve latch solenoid coil 42 to release the dump valve thereby permitting the partly frozen mixture to pass into the freezing receptacle. When the valve is released, the actuating spring 26 will assist the downward movement of the dump valve spindle. However, operation of the dasher unit will be continued for a predetermined period through delayed opening of the time delay relay 84. When the predetermined time delay has elapsed the dasher element will be stopped, and the device will be completely shut down.

Referring now to Fig. 9 which shows the electrical diagram of the modified form of device shown in Fig. 7, 114 represents the drive motor and L1 and L2 the supply lines.

The starter switch R is of the delayed-return action type and is provided with two sets of contacts R1 and R2. Contacts R1 are normally open, whereas contacts R2 are normally closed. Contacts R1 of the starter switch are connected to supply line L1 and to the drive motor 114 by means of leads 153 and 154, current returning from the motor to supply line L2 through lead 155. One of the normally closed contacts R2 of switch R is connected to one of the normally open contacts R1 thereof by means of a lead 156. The other contact R2 is connected to brush 117a by means of a lead 160, the coacting collector ring 117 being connected to one side of normally open limit switch 97 by means of a lead 161. The other side of limit switch 97 is connected to the collector ring 118 by means of a lead 162 and the brush 118a thereof is connected to the one side of the coil of a holding relay HR by means of a lead 163; the other side of this relay is connected to lead 164 by means of a lead 180. This holding relay has two sets of normally open contacts HR1 and HR2. Contact HR1 is connected in series with brush 118a and with one side of the coil of brake solenoid relay BSR by means of leads 181 and 182. The other pair of contacts HR2 are connected to the other side of the coil of relay BSR and to the lead 164 by means of leads 183 and 184, respectively. Lead 182 extending to one side of the coil of relay BSR is connected to lead 166 by means of lead 185. The brake solenoid relay BSR is provided with normally closed contacts BSR2 and with normally open contacts BSR1. One side of the normally closed contacts BSR2 is connected by means of leads 165 and 166 to motor lead 154. The other side of normally closed contacts BSR2 is connected to the forward brake solenoid 106 by means of a lead 170, current returning therefrom to line L2 over lead 171. Leads 165 and 166 are also connected with one of the contacts of the normally closed SMS limit switch 125 by means of a lead 172, the other side of the switch being connected to the supply line L1 by means of a lead 173. It is to be noted that normally-closed contacts of limit switch 125 are held open by switch flange 124 at all times while the freezer remains in shutdown condition.

When the starter switch R of this form of invention is depressed, the drive motor will receive current over leads 153, 154 and 155 and the forward brake solenoid 106 will be energized over leads 166, 165 and normally closed contacts BSR2 of brake solenoid relay BSR, over leads 170 and 171 to the supply line L2. This will stop the rotation of the forward gear brake drum 102 of the transmission thereby causing power to be transmitted to the dasher drive shaft 93. The opening of contacts R1 of the starter switch R and the closing of the contacts R2 thereof is delayed thereby maintaining the starting circuit to the drive motor 114 and also keeping forward brake solenoid 106 energized until the dasher element has moved downwardly sufficiently to disengage the flange 124 from the actuating plunger of the stop limit switch 125 thereby allowing the switch to close as shown in Fig. 9. The closing of switch 125 will maintain the operation of drive motor 114 and the energization of the forward brake solenoid 106 and current will flow from supply line L1 over lead 173, closed limit switch 125, lead 172 through leads 166 and 154 to and through motor 114 and lead 155 to line L2. When switch 125 is closed current will also flow through lead 165 to and through the normally closed contacts BSR2 of relay BSR, over lead 170 and thus through the forward brake solenoid 106 and back to the supply line L2 through lead 171. The momentary delay in reclosing of normally closed contacts R2 of the starter switch R prevents completion of the circuit to the brake solenoid relay BSR which would cause the forward brake solenoid 106 to be deenergized thereby releasing the forward brake and stopping the downward movement of the dasher in the event that accelerating torque should cause the inadvertent closing of limit switch 97 thus inadvertently energizing the reverse brake solenoid 111.

From the foregoing it will be obvious that the energization of the forward brake solenoid 106 will cause the threaded drive-shaft 93 to be rotated, first to screw the dasher down to working position within the freezing receptacle 91 and then to start its churning action in the receptacle until the ice cream has reached the proper consistency at which time the normally open limit switch 97 of the torque assembly 120 will be closed and current will then flow through closed limit switch 125 over leads 173, 172, 166 and 154 to and through lead 156 connecting one of each of contacts R1 and R2 of the starter switch R. Current will then flow across the armature connecting contacts R2 of the starter switch and thence over lead 160, brush 117a, collector ring 117, lead 161, closed limit switch 97, through lead 162, collector ring 118, brush 118a and lead 163 to and through the coil of holding relay HR and over lead 164 to supply line L2, thus energizing the holding relay and closing normally-open contacts HR1 and HR2. With the closing of contacts HR1, holding relay HR is sealed in against drop-out when contacts 97 of limit switch TRM are opened upon reversal of the direction of drive rotation through torque assembly 120. With the simultaneous closing of contacts HR2 upon energizing of holding relay HR, the coil of brake solenoid relay BSR is energized to open normally-closed contacts BSR2 and close normally-open contacts BSR1. When this relay is energized, flow of current through theh forward brake solenoid 106 is interrupted by the breaking of normally closed contacts BSR2. With the closing of normally open contacts BSR1 current will flow through the reverse brake solenoid 111, over leads 173, closed limit swtich 125, leads 172 and 165 across contacts BSR1 of the relay and through the reverse brake solenoid 111 over leads 174 and 175 back to the supply line L2. When the reverse brake solenoid 111 is energized, the screwthreaded drive shaft 93 will be rotated in its reverse direction and will cause the dasher 92 to be drawn upwardly out of the partially frozen ice cream and into the lower part of the housing. When the dasher reaches its upper extreme position, it will open closed contacts of limit switch 125 thereby breaking the circuit to drive motor 114 and also to the coils of both BSR and HR relays to terminate all operation of the device and thereby stop the upward travel of the dasher. With the opening of the circuit through limit switch 125, limit switch 97 will be returned to its normally open position, all current flow will then be interrupted and the brake solenoid relay BSR will drop out to allow its normally closed contacts BSR2 to close and contacts BSR1 will be opened ready for the next cycle of operation.

From the foregoing it will be obvious that the two basic features which distinguish my invention from other devices of a similar nature and which contribute most importantly to its superiority as a completely automatic appliance are: (1) the development of a drive element responsive to the build-up of torque-resistance to dasher rotation for establishment of the proper time for termination of dasher action, and (2) the development of effective means for disengagement of the dasher element from the partially frozen mixture before final freezing is accomplished.

What is claimed is:

1. The combination with a food freezing cabinet, of a dessert freezer, comprising a casing, means for supporting the casing within the freezing cabinet, a freezing compartment in the casing, a motor driven dasher unit within said compartment, means responsive to a predetermined consistency of the frozen mixture to stop the dasher unit, means for separating the partially frozen mixture and the dasher unit, and a chilling chamber located below the dasher unit for storing the partially frozen mixture for final freezing.

2. The combination with a food freezing cabinet, of a dessert freezer, comprising a casing, means for supporting the casing within the freezing cabinet, a freezing compartment in the casing, a motor driven dasher unit within said compartment, means responsive to a predetermined consistency of the frozen mixture to stop the dasher unit, a chilling chamber located below the dasher unit, and a dump valve between said compartment and said chamber to discharge the partly frozen mixture into the latter for final freezing.

3. The combination with a food freezing cabinet, of a dessert freezer, comprising a casing, a motor mounted in said casing, a freezing compartment detachably carried by said casing, a dasher unit mounted in said compartment, means for detachably connecting said unit to said motor, a chilling chamber detachably mounted below said freezing compartment, a dump valve at the bottom of said freezing compartment, and means responsive to a predetermined consistency of the frozen mixture to discharge the partly frozen mixture into said chilling chamber.

4. The combination with a food freezing cabinet, of a dessert freezer, comprising a casing, means for supporting the casing within the freezing cabinet, a freezing compartment in the casing, a motor driven dasher unit within said compartment, a chilling chamber disposed below said freezing compartment, a dump valve at the bottom of said compartment, and latch means for maintainingn said dump valve in closed position during freezing of the mixture, and means responsive to a predetermined consistency of the frozen mixture to release said latch means to open said valve for discharging the partly frozen mixture into said chilling chamber.

5. The combination with a food freezing cabinet, of a dessert freezer, comprising a casing, means for supporting the casing within the freezing cabinet, a motor in said casing, a freezing compartment detachably suspended from said casing, a dasher unit mounted within said compartment, torque means detachably connecting said dasher to said motor, a torque switch carried by said torque means and responsive to a predetermined consistency of the frozen mixture, a chilling chamber below said freezing compartment, a dump valve at the bottom of said freezing compartment, and latch means for maintaining said dump valve in closed position, and means actuated by said torque switch to release said latch means to open said dump valve for discharging said partially frozen mixture into said chilling chamber.

6. The combination with a food freezing cabinet, of a dessert freezer, comprising a casing, means for supporting the casing within the freezing cabinet, a motor in said casing, a freezing compartment detachably suspended from said casing, a dasher unit mounted within said compartment, torque means detachably connecting said dasher to said motor, a torque switch carried by said torque means and responsive to a predetermined consistency of the frozen mixture, a chilling chamber below said freezing compartment, a dump valve at the bottom of said freezing compartment, latch means for maintaining said dump valve in closed position, means actuated by said torque switch to release said latch means to open said dump valve for discharging said partially frozen mixture into said chilling chamber, and detent means engageable with said latch for limiting the downward movement of said dump valve.

7. The combination with a food freezing cabinet, of a dessert freezer, comprising a casing, means for supporting the casing within the freezing cabinet, a motor in said casing, a freezing compartment detachably suspended from said casing, a dasher unit mounted within said compartment, a torque assembly detachably connecting said dasher to said motor and comprising upper and lower torque flanges rotatable by said motor, resilient means connecting said flanges and actuated by the consistency of the frozen mixture, and a torque switch disposed between said flanges for effecting separation of the dasher unit from the partially frozen mixture when the frozen mixture has reached the predetermined consistency.

8. The combination with a food freezing cabinet, of a dessert freezer, comprising a casing, means for supporting the casing within the freezing cabinet, a stationary casing sleeve extending vertically through the casing, a freezing compartment below said casing, a dasher unit within said compartment and rotatably mounted upon said casing sleeve, a motor mounted in said casing for actuating said dasher unit, a torque assembly connecting said motor with said dasher unit, said assembly comprising an upper drive plate geared to said motor for rotation thereby, a lower plate mounted for relative rotation with said upper plate, and torque means between said plates to resist resiliently such relative rotation, means for detachably connecting said dasher unit to said lower plate, a valve spindle mounted for axial movement within said casing sleeve, a dump valve carried by said spindle, latch means carried by said sleeve for engagement with said spindle to maintain said valve in closed position, and switch means disposed between said torque plates for controlling the operation of said motor and for releasing said latch means to open said dump valve when the frozen mixture has reached the predetermined consistency.

9. The combination with a food freezing cabinet, of a dessert freezer, comprising a casing, means for supporting the casing within the freezing cabinet, a stationary casing sleeve extending vertically through the casing, a freezing compartment below said casing, a dasher unit within said compartment and rotatably mounted upon said sleeve, a motor mounted in said casing for actuating said dasher unit, a torque assembly connecting said motor with said dasher unit, said assembly comprising an upper drive plate geared to said motor for rotation thereby, a lower plate mounted for relative rotation with said upper plate, and torque means between said plates to resist resiliently relative rotation thereof, means for detachably connecting said dasher unit to said lower plate, a valve spindle mounted for axial movement within said casing sleeve and having a detent abutment, a dump valve carried by said spindle, latch means carried by said sleeve for engagement with said spindle to maintain said valve in closed position, said latch means comprising a plurality of pivotally mounted latch fingers surrounding said spindle and normally engaging said detent abutment, each finger having a trip lug, a latch core surrounding said latch fingers and engageable with said trip lugs, and means for actuating said core to release the latch means when the frozen mixture has reached the predetermined consistency, whereby said dump valve will be released.

10. The combination with a food freezing cabinet, of a dessert freezer, comprising a casing, means for supporting the casing within the freezing cabinet, a stationary casing sleeve extending vertically through the casing, a freezing compartment below said casing, a dasher unit within said compartment and rotatably mounted upon said sleeve, a motor mounted in said casing for actuating said dasher unit, a torque assembly connecting said motor with said dasher unit, said assembly comprising an upper drive plate geared to said motor for rotation thereby, a lower plate mounted for relative rotation with said upper plate, torque means between said plates to resist resiliently relative rotation thereof, means for detachably connecting said dasher unit to said lower plate, a valve spindle mounted for axial movement within said casing sleeve and having a detent abutment, a dump valve carried by said spindle, latch means carried by said sleeve for engagement with said spindle to maintain said valve in closed position, said latch means comprising a plurality of pivotally mounted latch fingers surrounding said spindle and normally engaging said detent abutment, each finger having a trip lug, a latch core surrounding said latch fingers and engageable with said trip lugs, means for actuating said core to release the latch means and to release said dump valve when the frozen mixture has reached the predetermined consistency, and a stop shoulder formed on said spindle and engageable with said latch fingers subsequent to their release from said detent abutment to interrupt the downward movement of said dump valve.

11. The combination with a food freezing cabinet, of a dessert freezer, comprising a casing, means for supporting the casing within the freezing cabinet, a stationary casing sleeve extending vertically through the casing, a freezing compartment below said casing, a dasher unit within said compartment and rotatably mounted upon said sleeve, a motor mounted in said casing for actuating said dasher unit, a torque assembly connecting said motor with said dasher unit, said assembly comprising an upper drive plate geared to said motor for rotation thereby, a lower plate mounted for relative rotation with said upper plate, torque means between said plates to resist resiliently relative rotation thereof, means for detachably connecting said dasher unit to said lower plate, a valve spindle mounted for axial movement within said casing sleeve and having a detent abutment, a dump valve carried by said spindle, latch means carried by said sleeve for engagement with said spindle to maintain said valve in closed position, said latch means comprising a plurality of pivotally mounted latch fingers surrounding said spindle and normally engaging said detent abutment, each finger having a trip lug, a latch core surrounding said latch fingers and engageable with said trip lugs, electro-magnetic means for actuating said core, and switch means disposed between said plates and actuated to energize said electro-magnetic means when the frozen mixture has reached the predetermined consistency.

12. The combination with a food freezing cabinet, of a dessert freezer, comprising a casing, means for supporting the casing within the freezing cabinet, a freezing compartment detachably suspended below said casing, a dasher unit, a drive shaft mounted in said casing and associated with said dasher unit, motor driven gear means engageable with said shaft, actuating means carried by said shaft and said unit to lower said unit into said freezing compartment upon initial rotation of said shaft, and to continue to rotate said dasher unit in said freezing compartment, and torque-controlled means comprising upper and lower torque flanges rotatable by said motor driven gear means, resilient means connecting said flanges and actuated by the consistency of the frozen mixture, and a torque switch disposed between said flanges for reversal of said actuating means and separation of said dasher unit from said mixture when partially frozen mixture has reached the predetermined consistency.

13. The combination with a food freezing cabinet, of a dessert freezer, comprising a casing, means for supporting the casing within the freezing cabinet, a freezing compartment detachably suspended below said casing, a dasher unit, a drive shaft mounted in said casing and having screwthreaded engagement with said dasher unit, motor-driven gear means engageable with said shaft, selective coupling means for connecting said shaft with said gear means, whereby when said shaft is rotated in one direction the dasher will be initially moved into said freezing compartment and will continue to rotate therein, and torque-controlled means comprising upper and lower torque flanges rotatably carried by said motor driven gear means, resilient means connecting said flanges and actuated by the consistency of the frozen mixture, and a torque switch disposed between said flanges for actuating said selective coupling means to effect reversal of rotation for separating said dasher unit from said mixture when partially frozen mixture has reached the predetermined consistency.

14. The combination with a food freezing cabinet, of a dessert freezer, comprising a casing, means for supporting the casing within the freezing cabinet, a stationary casing sleeve extending vertically through the casing, a freezing compartment below said casing, a dasher unit within said compartment, comprising a dasher sleeve rotatably mounted upon said casing sleeve and provided with dasher elements, a torque assembly connecting said motor with said dasher sleeve comprising an upper drive plate geared to said motor for rotation thereby, a lower plate mounted for relative rotation with said upper plate, means for detachably connecting said dasher sleeve to said lower plate, a valve spindle mounted for axial movement within said casing sleeve, a dump valve carried by said spindle, latch means carried by said sleeve for engagement with said spindle to maintain said valve in closed position, and switch means disposed between said torque plates for controlling the operation of said motor and for releasing said latch means to open said dump valve when the frozen mixture has reached the predetermined consistency.

15. The combination with a food freezing cabinet, of a dessert freezer, comprising a casing, a freezing compartment in the casing, a motor driven dasher unit within said compartment, means mounted within said casing and responsive to a predetermined consistency of the partially frozen mixture to separate the mixture from said dasher unit, whereby further agitation of such mixture is interrupted to permit final freezing thereof within said casing, and means for automatically stopping said unit subsequent to the separation of said mixture from said dasher.

References Cited in the file of this patent

UNITED STATES PATENTS

| | | |
|---|---|---|
| 1,756,286 | Farrall | Apr. 29, 1930 |
| 1,763,567 | Simmons | June 10, 1930 |
| 1,766,172 | Hiles | June 24, 1930 |
| 1,783,867 | Vogt | Dec. 2, 1930 |
| 1,981,009 | Torson | Nov. 20, 1934 |
| 1,987,258 | Kinzey | Jan. 8, 1935 |
| 1,999,794 | Thompson | Apr. 30, 1935 |
| 2,116,002 | Shaw | May 3, 1938 |
| 2,139,576 | Davis | Dec. 6, 1938 |
| 2,272,614 | Reinken | Feb. 10, 1942 |
| 2,522,648 | Tacchella | Sept. 19, 1950 |
| 2,536,319 | Slack | Jan. 2, 1951 |
| 2,702,992 | Mooser | Mar. 1, 1955 |
| 2,723,539 | Wenzelberger | Nov. 15, 1955 |
| 2,753,029 | Babaian | July 3, 1956 |